United States Patent
Naito et al.

(10) Patent No.: US 11,182,387 B2
(45) Date of Patent: Nov. 23, 2021

(54) DATAFLOW CONTROL INSTRUCTION GENERATION DEVICE, DATAFLOW CONTROL INSTRUCTION GENERATION METHOD, AND DATAFLOW CONTROL INSTRUCTION GENERATION PROGRAM

(71) Applicant: OMRON Corporation, Kyoto (JP)

(72) Inventors: Takeshi Naito, Ibaraki (JP); Tetsuji Yamato, Yokohama (JP); Toshihiko Oda, Kusatsu (JP); Shuichi Misumi, Kyoto (JP)

(73) Assignee: OMRON Corporation, Kyoto (JP)

( * ) Notice: Subject to any disclaimer, the term of this patent is extended or adjusted under 35 U.S.C. 154(b) by 96 days.

(21) Appl. No.: 16/346,558

(22) PCT Filed: Oct. 16, 2017

(86) PCT No.: PCT/JP2017/037400
§ 371 (c)(1),
(2) Date: May 1, 2019

(87) PCT Pub. No.: WO2018/123211
PCT Pub. Date: Jul. 5, 2018

(65) Prior Publication Data
US 2019/0266162 A1    Aug. 29, 2019

(30) Foreign Application Priority Data

Dec. 27, 2016 (JP) .............................. JP2016-253225

(51) Int. Cl.
*G06F 16/2455* (2019.01)
*G06F 16/23* (2019.01)
*G06F 16/00* (2019.01)

(52) U.S. Cl.
CPC ........ *G06F 16/24558* (2019.01); *G06F 16/00* (2019.01); *G06F 16/2379* (2019.01)

(58) Field of Classification Search
None
See application file for complete search history.

(56) References Cited

U.S. PATENT DOCUMENTS

2007/0198511 A1* 8/2007 Kim ...................... G06F 16/632
2014/0372561 A1    12/2014 Hisano

FOREIGN PATENT DOCUMENTS

| JP | 2013-077152 A | 4/2013 |
| JP | 5444722 B2 | 3/2014 |
| WO | 2014/041826 A1 | 3/2014 |

OTHER PUBLICATIONS

English translation of the International Search Report("ISR") of PCT/JP2017/037400 dated Jan. 9, 2018.

(Continued)

*Primary Examiner* — Charles E Anya
(74) *Attorney, Agent, or Firm* — Metrolex IP Law Group, PLLC

(57) ABSTRACT

Provided are a dataflow control command generation apparatus, a dataflow control command generation method, and a dataflow control command generation program by which open data is distributed as appropriate and open data can be smoothly used by an application. A dataflow control command generation apparatus includes a first data-side metadata acquisition unit configured to acquire first data-side metadata that is information regarding first data, an application-side metadata acquisition unit configured to acquire application-side metadata that is information regarding an application that provides a service using first data, a matching unit configured to extract first data that meets a requirement of an application through matching between the first data-side metadata and the application-side metadata, and a transmission unit configured to transmit, to a user terminal apparatus that executes the application, a dataflow control (Continued)

command including information for acquiring the first data from a database storing the extracted first data.

17 Claims, 10 Drawing Sheets

(56) References Cited

OTHER PUBLICATIONS

Written Opinion("WO") of PCT/JP2017/037400 dated Jan. 9, 2018.
Anonymous, "Using Multiple DataSources in Spring MVC", Retrieved from the Internet https://web.archive.org/web/20161025180026/https://o7planning.org/en/10859/using-multiple-datasources-in-spring-mvc (retrieved on Dec. 11, 2019), Oct. 25, 2016, XP055651863; Relevance is indicated in the extended European search report dated Jan. 2, 2020.
Anonymous, "RedirectAttributes (Spring Framework 4.2.5. RELEASE API)", Retrieved from the Internet https://web.archive.org/web/20160323031418/https://docs.spring.io/spring/docs/current/javadoc-api/org/springframework/web/servlet/mvc/support/RedirectAttributes.html (retrieved on Dec. 11, 2019), Mar. 23, 2016, XP055652053; Relevance is indicated in the extended European search report dated Jan. 2, 2020.
Anonymous, "Push technology—Wikipedia, the free encyclopedia", Retrieved from the Internet https://en.wikipedia.org/w/index.php?title=Push_technology&oldid=468308083 (retrieved on Apr. 1, 2016), Dec. 29, 2011, XP055261985; Relevance is indicated in the extended European search report dated Jan. 2, 2020.
Extended European search report dated Jan. 2, 2020 in a counterpart European patent application.
Communication pursuant to Article 94(3) EPC dated Feb. 24, 2021 in a counterpart European patent application.

* cited by examiner

FIG. 10

River disaster prevention information
Past data (water level of river)

| Water system name | River name | Location |
|---|---|---|
| Y River | X River | B City, A Prefecture |

DP1

| Date | YY/MM/DD | | yy/mm/dd | |
|---|---|---|---|---|
| Observation item | Water level (m) | | Water level (m) | |
| 01:00 | 0.98 | | 0.95 | |
| 02:00 | 0.98 | | 0.95 | |
| 24:00 | 0.95 | | 0.96 | |

DP2 DP3

… (1) …

DATAFLOW CONTROL INSTRUCTION GENERATION DEVICE, DATAFLOW CONTROL INSTRUCTION GENERATION METHOD, AND DATAFLOW CONTROL INSTRUCTION GENERATION PROGRAM

TECHNICAL FIELD

The present invention relates to a dataflow control command generation apparatus, a dataflow control command generation method, and a dataflow control command generation program.

BACKGROUND ART

Technology called IoT (Internet of Things) has advanced in recent years. The IoT is technology for producing new value by combining pieces of information regarding various things throughout the world, on a communication network. In order to produce value from the IoT, the state of an object needs to be read using a sensor and sensing data needs to be distributed.

With regard to the mechanism for distributing sensing data, Patent Literature 1 discloses a dataflow control command generation apparatus configured to perform matching between sensor-side metadata that is information regarding a sensor that outputs sensing data, and application-side metadata that is information regarding an application that provides a service using sensing data, and transmit a dataflow control command in which the sensor and the application that have been matched are specified.

CITATION LIST

Patent Literature

Patent Literature 1: Japanese Patent No. 5444722

SUMMARY OF INVENTION

Technical Problem

Meanwhile, governments promote usage and utilization of "open data", which is public data. According to governments, open data refers to "data that is published in a data format that is suitable for machine reading under a usage rule that allows secondary use", and "data for enabling secondary use of data with little labor". Open data is provided in databases by countries and local governments, and these databases are collected in data catalog sites.

However, if an application that provides a service using open data is created, trial and error is sometimes required in order to retrieve and extract desired open data from a data catalog site or the like. Although anyone can access open data, the distribution environment is not always maintained, and sometimes it is not easy to find open data that meets requirements of an application.

In view of this, an object of the present invention is to provide a dataflow control command generation apparatus, a dataflow control command generation method, and a dataflow control command generation program by which data is distributed as appropriate and data is smoothly used by an application.

Solution to Problem

A dataflow control command generation apparatus according to one aspect of the present invention includes a first data-side metadata acquisition unit configured to acquire first data-side metadata that is information regarding first data, an application-side metadata acquisition unit configured to acquire application-side metadata that is information regarding an application that provides a service using the first data, a matching unit configured to extract first data that meets a requirement of the application through matching between the first data-side metadata and the application-side metadata, and a transmission unit configured to transmit, to a user terminal apparatus that executes the application, a dataflow control command including information for acquiring the first data from a database in which the first data extracted by the matching unit is stored.

According to this aspect, data that is suitable for use by an application can be extracted and data can be easily acquired by this application without performing many operations and taking up a large amount of communication traffic using a processor of the user terminal apparatus that executes an application to retrieve data, and thus the operation load and the communication load on the user terminal apparatus can be reduced. Also, data is distributed as appropriate, and data is smoothly used by an application.

In the above-described aspect, the transmission unit may be configured to transmit the dataflow control command to a first data management apparatus that manages the first data extracted by the matching unit.

According to this aspect, pieces of first data can be collectively managed by the first data management apparatus, and when the user terminal apparatus uses first data, the operation load and the communication load for retrieving target first data can be reduced.

In the above-described aspect, the dataflow control command generation apparatus may further include a metadata generation unit configured to generate first data-side metadata based on the content of the first data.

According to this aspect, even if first data is not provided with metadata, it is possible to newly generate metadata, and provide an opportunity for first data to be used by an application. Accordingly, a larger amount of first data can be used by an application executed on a user terminal apparatus while the operation load and the communication load on the user terminal apparatus are reduced.

In the above-described aspect, the metadata generation unit may be configured to retrieve the first data based on a vocabulary corresponding to a genre to which the first data belongs, and extract the first data-side metadata from the first data.

According to this aspect, it is possible to retrieve first data using a vocabulary that is suitable for the content of the first data, efficiently extract first data-side metadata, and thus to further reduce the operation load on the dataflow control command generation apparatus and generate first data-side metadata.

In the above-described aspect, the dataflow control command transmitted by the transmission unit may include API data for calling processing in which the first data is acquired by the application from the database in which the first data is stored.

According to this aspect, the need to determine a method for processing data each time data is used is eliminated, and processing executed by an application is simplified, and the operation load on the user terminal apparatus is reduced.

In the above-described aspect, the dataflow control command generation apparatus may further include a second data-side metadata acquisition unit configured to acquire second data-side metadata that is information regarding second data, in which the matching unit may be configured to extract second data that meets a requirement of the application through matching between the second data-side metadata and the application-side metadata, the transmission unit may be configured to transmit, to a second data management apparatus that manages the second data extracted by the matching unit, a dataflow control command in which the second data extracted by the matching unit and the application are specified, and the dataflow control command generation apparatus may further include a determination unit configured to determine which of the first data-side metadata or the second data-side metadata is to be matched with the application-side metadata by the matching unit.

According to this aspect, even if it is not clear in advance that data required by the application is included in first data or second data, an appropriate matching target is determined by the determination unit, and thus an appropriate dataflow control command can be generated. Accordingly, the user terminal apparatus does not need to determine whether the data required by the application is included in either first data or second data, and the operation load and the communication load on the user terminal apparatus are reduced.

In the above-described aspect, the dataflow control command generation apparatus may further include a second data-side metadata acquisition unit configured to acquire second data-side metadata regarding second data, in which the matching unit may be configured to extract second data that meets a requirement of the application through matching between the second data-side metadata and the application-side metadata, the transmission unit may be configured to transmit, to a second data management apparatus that manages the second data extracted by the matching unit, a dataflow control command in which the second data extracted by the matching unit and the application are specified, and the matching unit may be configured to preferentially match the first data-side metadata with the application-side metadata rather than the second data-side metadata.

According to this aspect, even if it is not clear in advance that data required by the application is included in first data or second data, an appropriate dataflow control command can be generated through consistent processing. Accordingly, operations and communication of dataflow control command generation processing performed by the dataflow control command generation apparatus are simplified, and the operation load and the communication load on the dataflow control command generation apparatus are reduced. Also, the user terminal apparatus does not need to determine whether the data required by the application is included in either first data or second data, and the operation load and the communication load on the user terminal apparatus are reduced.

In the above-described aspect, the transmission unit may be configured to transmit, to the second data management apparatus, a dataflow control command for transmitting push-type second data to the application, if the second data-side metadata is matched with the application-side metadata by the matching unit.

According to this aspect, the application can acquire second data in real time. Also, the need to retrieve second data that meets a requirement of an application using the processor of the user terminal apparatus is eliminated, and the operation load and the communication load on the user terminal apparatus are reduced.

In the above-described aspect, the first data may include data stored in the database, and the second data may include data output from a sensor.

According to this aspect, it is possible to distribute both static data and dynamic data output in real time as appropriate, and facilitate use of data by an application. Also, static data and dynamic data are classified according to metadata, and thus processing for classifying static data and dynamic data using the user terminal apparatus is not required, and the operation load on the user terminal apparatus is reduced.

In the above-described aspect, the first data may include data that can be secondarily used for free, and the second data may include data that cannot be secondarily used or can be secondarily used with a fee.

According to this aspect, both free data and paid data can be distributed as appropriate, and can be smoothly used by an application. Also, free data and paid data are classified according to metadata, and thus processing for classifying free data and paid data using the user terminal apparatus is not required, and the operation load on the user terminal apparatus is reduced.

A dataflow control command generation method according to one aspect of the present invention include a first step of acquiring first data-side metadata that is information regarding first data, a second step of acquiring application-side metadata that is information regarding an application that provides a service using the first data, a third step of extracting first data that meets a requirement of the application through matching between the first data-side metadata and the application-side metadata, and a fourth step of transmitting, to a user terminal apparatus that executes an application, a dataflow control command including information for acquiring the first data from a database in which the first data extracted in the third step is stored.

According to this aspect, data that is suitable for use by an application can be extracted and data can be easily acquired by this application without performing many operations and taking up a large amount of communication traffic using a processor of the user terminal apparatus that executes an application to retrieve data, and thus the operation load and the communication load on the user terminal apparatus can be reduced. Also, data is distributed as appropriate, and data is smoothly used by an application.

A dataflow control command generation program according to one aspect of the present invention causes a computer to function as a first data-side metadata acquisition unit configured to acquire first data-side metadata that is information regarding first data, an application-side metadata acquisition unit configured to acquire application-side metadata that is information regarding an application that provides a service using the first data, a matching unit configured to extract first data that meets a requirement of the application through matching between the first data-side metadata and the application-side metadata, and a transmission unit configured to directly or indirectly transmit, to a user terminal apparatus that executes the application, a dataflow control command including information for acquiring the first data from a database in which the first data extracted by the matching unit is stored.

According to this aspect, data that is suitable for use by an application can be extracted and data can be easily acquired by this application without performing many operations and taking up a large amount of communication traffic using a processor of the user terminal apparatus that executes an application to retrieve data, and thus the operation load and the communication load on the user terminal apparatus can be reduced. Also, data is distributed as appropriate, and data is smoothly used by an application.

Advantageous Effects of Invention

According to the present invention, a dataflow control command generation apparatus, a dataflow control command generation method, and a dataflow control command generation program by which data is distributed as appropriate and data is smoothly used by an application are provided.

BRIEF DESCRIPTION OF DRAWINGS

FIG. 10 is a diagram showing an example of a web page in which open data is published.

DESCRIPTION OF EMBODIMENTS

Figure 1:
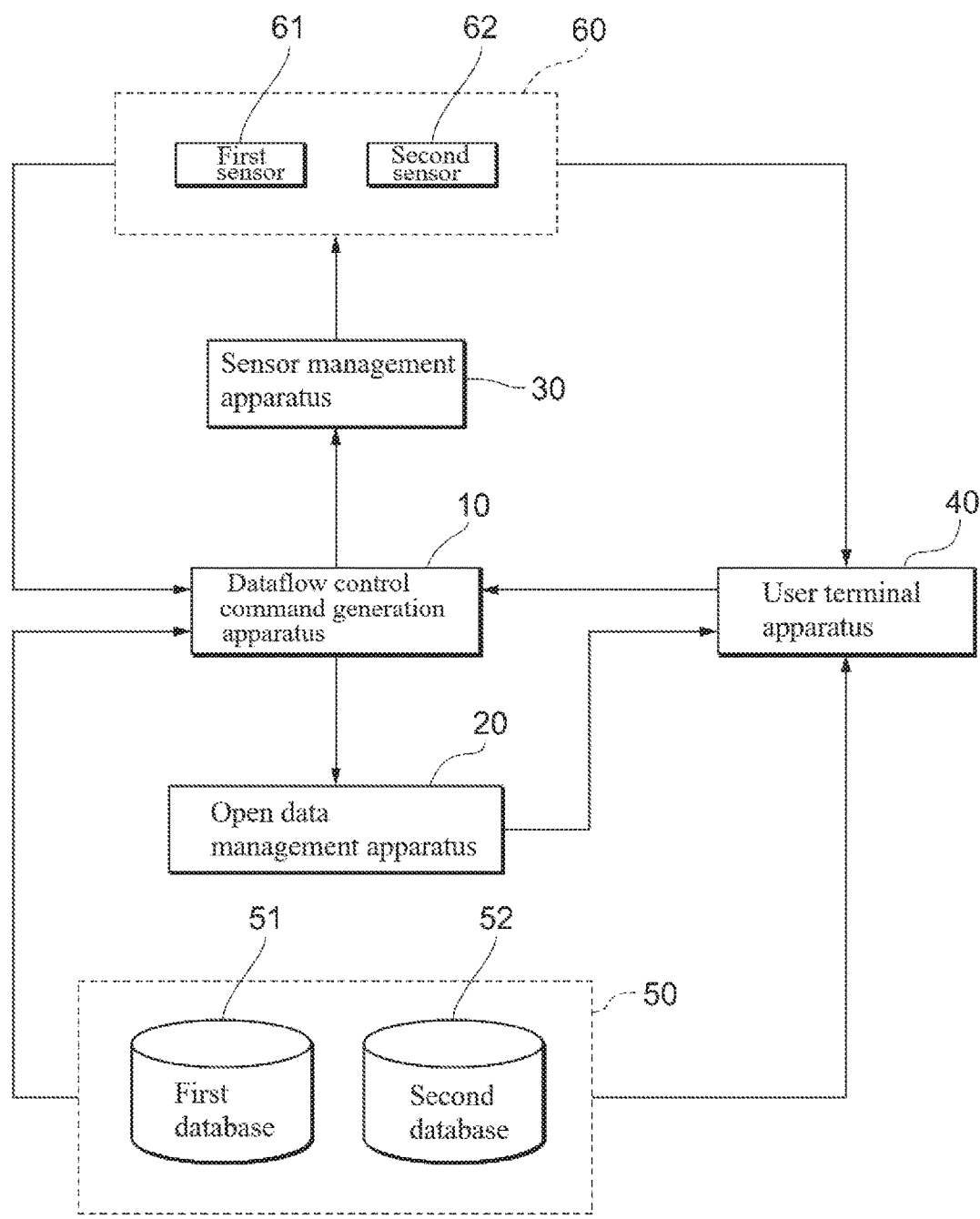
FIG. 1 is a diagram showing an overview of data distribution controlled by a dataflow control command generation apparatus according to an embodiment of the present invention.

An embodiment of the present invention will be described with reference to the attached drawings. Note that constituent elements with the same reference numeral have the same or similar configuration in the drawings.

FIG. 1 is a diagram showing an overview of data distribution controlled by a dataflow control command generation apparatus 10 according to an embodiment of the present invention. The dataflow control command generation apparatus 10 generates a dataflow control command such that a user terminal apparatus 40 can acquire closed data output from a sensor group 60 or open data recorded in a database included in a database group 50, according to a requirement of an application executed on the user terminal apparatus 40. The dataflow control command generation apparatus 10 acquires application-side metadata regarding an application from the user terminal apparatus 40, and performs matching between the application-side metadata and open data-side metadata or sensor-side metadata. The dataflow control command generation apparatus 10 transmits an open data-side dataflow control command to the open data management apparatus 20, or transmits a sensor-side dataflow control command to a sensor management apparatus 30, according to the result of matching. Note that the dataflow control command generation apparatus 10 may directly or indirectly transmit the open data-side dataflow control command and the sensor-side dataflow control command to the user terminal apparatus 40.

The open data management apparatus 20 corresponds to a first data management apparatus. The dataflow control command generation apparatus 10 transmits the open data-side dataflow control command to the open data management apparatus 20, and the open data management apparatus 20 transmits data (referred to as "first condition data" hereinafter) regarding conditions included at least in the open data-side dataflow control command to the user terminal apparatus 40. The first condition data includes information for acquiring open data from a database, and the user terminal apparatus 40 acquires pull-type open data based on the first condition data. Herein, "acquiring pull-type data" refers to "a user terminal apparatus accessing a database and acquiring data from the database based on a requirement received from the user terminal apparatus".

In this specification, first data includes open data. Open data is static or dynamic data stored in a database. Examples of open data include railway operation data and path/aircraft flight operation data in the field of public transportation. Also, examples of open data include base map information (a road map, a hazard map, and the like), weather radar data, and car probe data in the field of G space (the field regarding geospatial information). Also, open data may be stored in any number of databases. In this example, open data is stored in a first database 51 and a second database 52 that are included in the database group 50. Open data may be data that can be secondarily used for free. Herein, "data that can be secondarily used" refers to "data for which secondary use is permitted without restrictions and data for which secondary use is permitted as long as a usage rule regarding data use and modification is obeyed". Open data is not necessarily constituted by only sensing data, and may include statistical data and POS (Point Of Sales) data, and the like. Open data is stored in a database that is published by a government office, and is sometimes registered in a data catalog site, for example. Herein, a "data catalog site" refers to a "website on which an open data catalog regarding registered open data is published". An open data catalog (not shown in FIG. 1) includes bibliographic information regarding open data, shows the overview of open data, and may be handled separately from open data. An open data catalog may be stored in a database that is the same as the database in which open data is stored, or may be stored in another database.

The sensor management apparatus 30 corresponds to a second data management apparatus, and transmits, to a sensor extracted by the dataflow control command generation apparatus 10, a sensor-side dataflow control command for transmitting, from the sensor, push-type sensing data to an application executed on the user terminal apparatus 40. The user terminal apparatus 40 acquires the push-type sensing data transmitted from the sensor. Herein, "transmitting push-type data" refers to "transmitting data to the user terminal apparatus as a result of a database or the like actively transmitting data to the user terminal apparatus even if the user terminal apparatus does not require the database or the like to transmit data".

In this specification, second data includes closed data. Closed data includes dynamic data such as sensing data output from a sensor included in the sensor group 60, for example. The sensor group 60 is constituted by any number of devices that sense any target, and includes a first sensor 61 and a second sensor 62 in this example. Closed data output from the sensor group 60 is data that cannot be secondarily used or data that can be secondarily used with a fee, and may be data for which a separate use contract is required for use.

Figure 2:
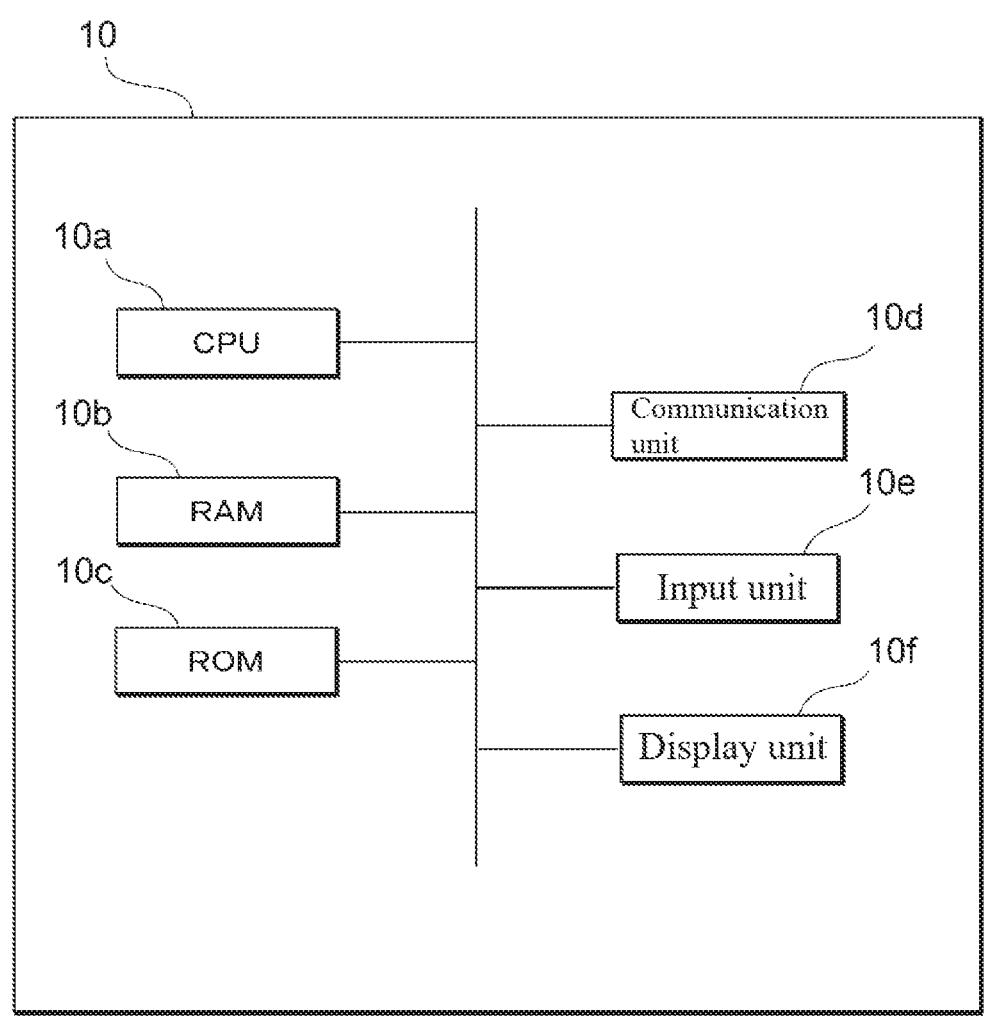
FIG. 2 is a diagram showing a physical configuration of a dataflow control command generation apparatus according to an embodiment of the present invention.

FIG. 2 is a diagram showing a physical configuration of the dataflow control command generation apparatus 10 according to an embodiment of the present invention. The dataflow control command generation apparatus 10 has a CPU (Central Processing Unit) 10a corresponding to a hardware processor, a RAM (Random Access Memory) 10b corresponding to a memory, a ROM (Read only Memory) 10c corresponding to a memory, a communication unit 10d, an input unit 10e, and a display unit 10f. These elements are connected via a bus so as to be capable of mutually transmitting and receiving data.

The CPU 10a is a controller that performs control regarding execution of programs stored in the RAM 10b or the ROM 10c, and calculate and process data. The CPU 10a is an arithmetic unit that executes an application for generating a dataflow control command. The CPU 10a receives various types of input data from the input unit 10e and the communication unit 10d, displays the result of calculation of input data on the display unit 10f, and stores the result in the RAM 10b and the ROM 10c.

The RAM 10b is a data rewritable storage unit, and is constituted by a semiconductor memory device, for example. The RAM 10b stores programs and data regarding applications etc. executed by the CPU 10a.

The ROM 10c is a data readable storage unit, and is constituted by a semiconductor memory device, for example. The ROM 10c stores programs and data such as firmware, for example.

The communication unit 10d is an interface for connecting the dataflow control command generation apparatus to a communication network, and is connected to a communication network such as a LAN (Local Area Network), a WAN (Wide Area Network), or the Internet constituted by a wired or wireless data transmission path, for example.

The input unit 10e accepts a data input made by a user, and is constituted by a keyboard, a mouse, and a touch panel, for example.

The display unit 10f visually displays the result of operations performed by the CPU 10a, and is constituted by an LCD (Liquid Crystal Display), for example.

The dataflow control command generation apparatus 10 may be constituted by the CPU 10a of an ordinary personal computer executing a dataflow control command generation program according to the present embodiment. The dataflow control command generation program may be provided in a state of being stored in a computer-readable storage medium such as the RAM 10b or the ROM 10c, or may also be provided through a communication network that is connected to by the communication unit 10d.

Note that these physical configurations are merely examples, and do not necessarily have to be independent from each other. For example, the dataflow control command generation apparatus 10 may also include an LSI (Large-Scale Integration) chip in which the CPU 10a, the RAM 10b, and the ROM 10c are integrated together.

Figure 3:
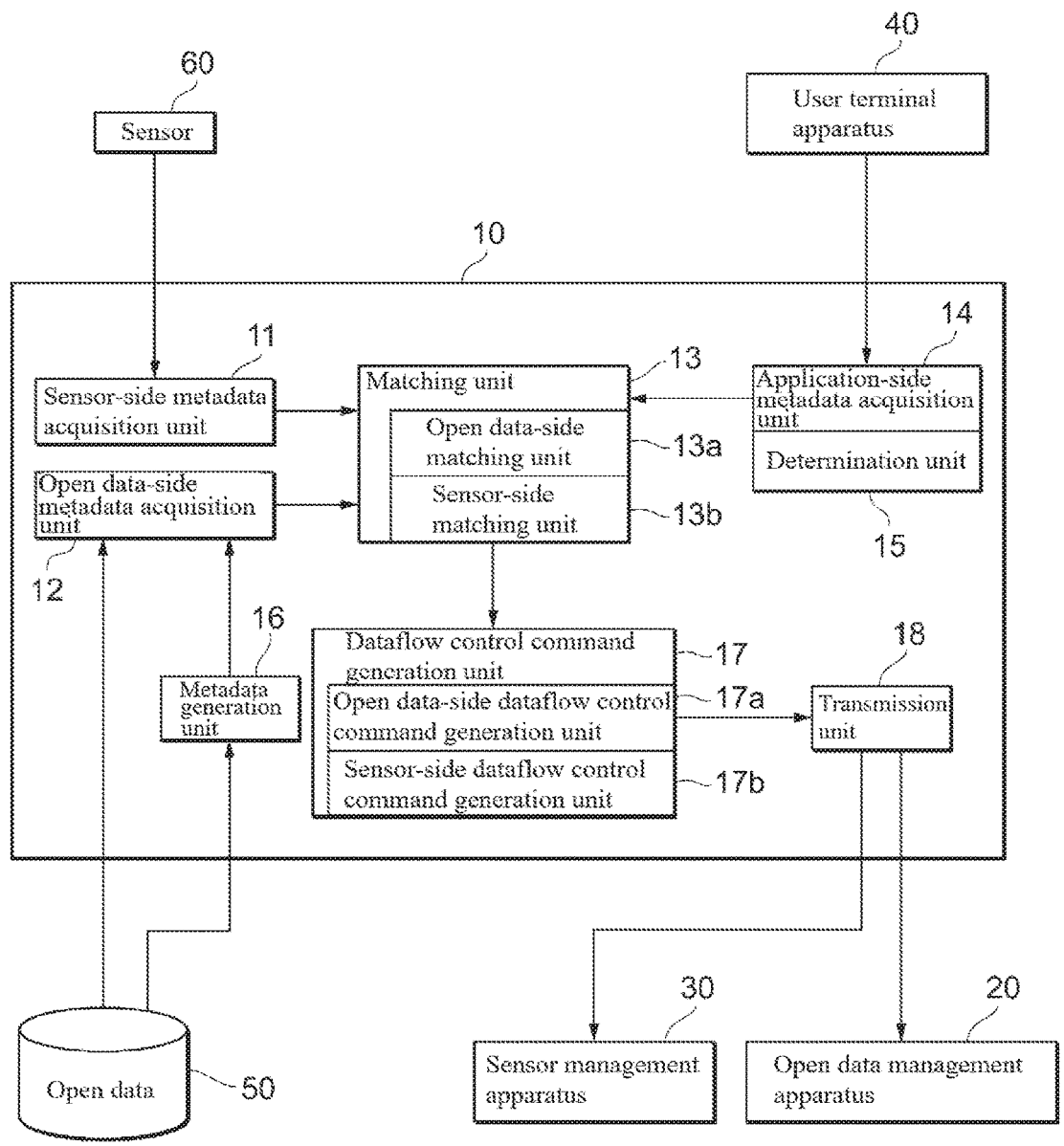
FIG. 3 is a functional block diagram of the dataflow control command generation apparatus according to an embodiment of the present invention.

FIG. 3 is a functional block diagram of the dataflow control command generation apparatus 10 according to an embodiment of the present invention. The dataflow control command generation apparatus 10 includes a sensor-side metadata acquisition unit 11, an open data-side metadata acquisition unit 12, a matching unit 13, an application-side metadata acquisition unit 14, a determination unit 15, a metadata generation unit 16, a dataflow control command generation unit 17, and a transmission unit 18. Note that the functional blocks shown in FIG. 3 represent the functions exerted using the physical configurations of the dataflow control command generation apparatus 10, and do not necessarily correspond one-to-one with the physical configuration.

The sensor-side metadata acquisition unit 11 corresponds to a second data-side metadata acquisition unit, and acquires sensor-side metadata that is information regarding the sensor group 60 that outputs closed data. The open data-side metadata acquisition unit 12 corresponds to a first data-side metadata acquisition unit, and acquires open data-side metadata that is information regarding open data. Although the sensor-side metadata is acquired from the sensor group 60 (sensor-side metadata is acquired from at least one of the first sensor 61 and the second sensor 62) in this example, the sensor-side metadata acquisition unit 11 may acquire sensor-side metadata from a database in which sensor-side metadata is stored. Also, although open data-side metadata is acquired from at least one of the first database 51 and the second database 52 in which open data is stored in this example, the open data-side metadata acquisition unit 12 may acquire open data-side metadata from a database in which only open data-side metadata is stored. Also, as will be described later in detail, open data-side metadata is not necessarily stored in a database in advance, and may be generated by the metadata generation unit 16. The metadata generation unit 16 acquires a portion of the open data-side metadata from the open data catalog. Also, the metadata generation unit 16 generates a portion of the open data-side metadata based on open data.

The application-side metadata acquisition unit 14 acquires, from the user terminal apparatus 40, application-side metadata regarding an application that provides a service using open data. Also, the application-side metadata acquisition unit 14 may acquire, from the user terminal apparatus 40, application-side metadata regarding an application that provides a service using closed data. The application-side metadata acquisition unit 14 may also acquire application-side metadata regarding an application for which it is not clear whether to use open data or closed data.

The matching unit 13 includes an open data-side matching unit 13a and a sensor-side matching unit 13b. The open data-side matching unit 13a extracts open data that meets a requirement of an application executed on the user terminal apparatus 40 through matching between open data-side metadata and application-side metadata. The sensor-side matching unit 13b extracts closed data that meets the requirement of an application through matching between sensor-side metadata and application-side metadata. More specifically, the sensor-side matching unit 13b extracts closed data that meets the requirement of the application executed on the user terminal apparatus 40 through matching between sensor-side metadata and application-side metadata, and extracts a sensor that can provide this closed data from the sensor group 60.

The determination unit 15 determines, based on application-side metadata, which of the open data-side metadata or the sensor-side metadata is to be matched with application-side metadata by the matching unit 13.

The dataflow control command generation unit 17 includes an open data-side dataflow control command generation unit 17a and a sensor-side dataflow control command generation unit 17b. The open data-side dataflow control command generation unit 17a generates an open data-side dataflow control command including first condition data for acquiring open data extracted by the open data-side matching unit 13a from the application executed on the user terminal apparatus 40. The sensor-side dataflow control command generation unit 17b generates a sensor-side dataflow control command in which the sensor extracted by the sensor-side matching unit 13b and the application executed on the user terminal apparatus 40 are specified.

The transmission unit 18 directly or indirectly transmits the open data-side dataflow control command generated by the open data-side dataflow control command generation unit 17a to the user terminal apparatus 40 that executes the application. The transmission unit 18 according to the present embodiment transmits the open data-side dataflow control command to the open data management apparatus 20 that manages open data. That is, the transmission unit 18 indirectly transmits the open data-side dataflow control command to the user terminal apparatus 40. However, the transmission unit 18 may directly transmit the open data-side dataflow control command to the user terminal apparatus 40. Also, the transmission unit 18 transmits the sensor-side dataflow control command generated by the sensor-side dataflow control command generation unit 17b to the sensor management apparatus 30 that manages the sensor group 60 extracted by the matching unit 13.

The metadata generation unit 16 generates open data-side metadata based on the content of open data. The metadata generation unit 16 analyzes character data included in the open data, extracts 4W2H data that will be described later in detail, and generates open data-side metadata. Note that open data-side metadata generation processing performed by the metadata generation unit 16 will be described in detail with reference to FIGS. 9 to 11.

Figure 4:
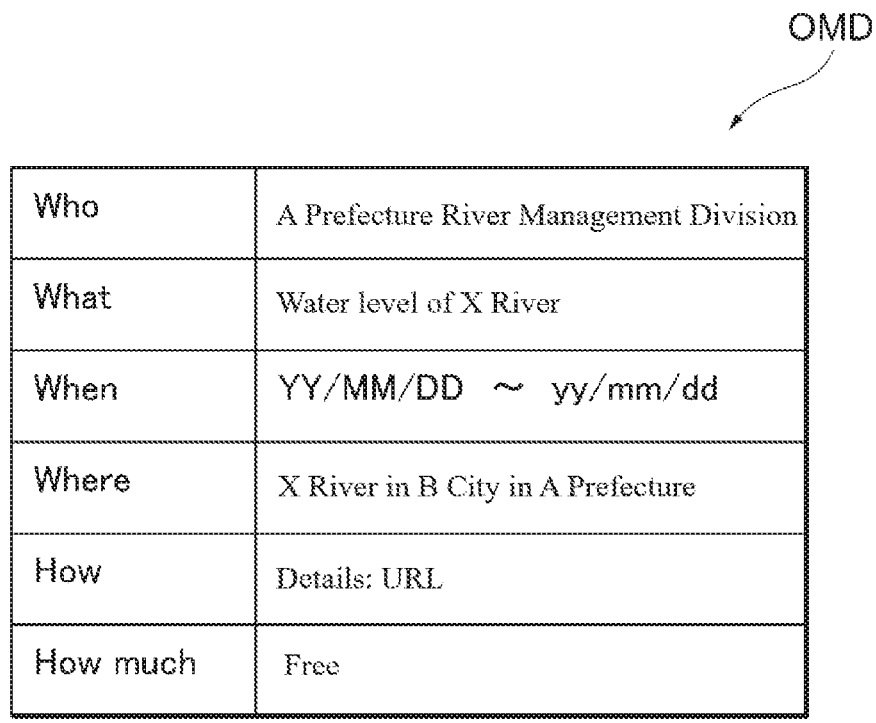
FIG. 4 is a diagram showing one example of the content of open data-side metadata.

FIG. 4 is a diagram showing one example of the content of open data-side metadata OMD. The open data-side metadata OMD corresponds to first data-side metadata, is data that is needed to determine whether or not open data meets the application requirement, and includes 4W2H data in this example. 4W2H data is data indicating who, what, when, where, how to acquire, and how much to provide. The open data-side metadata OMD may be stored in a database together with open data, stored in another database, or generated by the metadata generation unit 16.

The item "Who" included in the open data-side metadata OMD indicates data regarding a data provider or a data providing organization. The item "What" indicates data regarding types of data, measurement targets, and attributes of measurement targets. The item "Where" indicates data regarding a position and a location of where a measurement is made. However, if the sensor that acquires data moves and the measurement position changes, the item "Where" indicates a range of the measurement position. The item "When" indicates data regarding time when measurement is made. If data acquisition is repeated cyclically, the item "When" indicates a data acquisition time period and a data acquisition interval, and if data is acquired once, the date, hours, minutes, and seconds at which data is acquired. The item "How" indicates data regarding the specification, measurement conditions, and installation conditions of a device that acquires data. The item "How much" indicates data regarding money required to use data and a payment method.

In the example shown in FIG. 4, "A Prefecture River Management Division" is written in the item "Who", which indicates that the corresponding open data is provided by the River Management Division of A Prefecture. "Water Level of X River" is written in the item "What", which indicates that the measurement target is the water level of the X River. "YY/MM/DD to yy/mm/dd" are written in the item "When", which indicates that a data acquisition time period starts from month MM and day DD in year YY to month mm and day dd in year yy. Note that, although the measurement interval is not specified, the measurement interval may be 12 o'clock every day, for example. Also, the item "When" may include data regarding hours, minutes, and seconds at which pieces of data are acquired.

"X River in B City in A Prefecture" is written in the item "Where", which indicates that the data acquisition location is the X River flowing in B City in A Prefecture. The item "Where" may include data regarding the latitude and the longitude at which data is acquired. "Details: URL" are written in the item "How", which indicates a URL expressing the location of data where details are written. Data whose location is indicated by this URL includes the specification of a device used to measure the data, the location at which the device is installed, and the description of an object of measurement. "Free" is written in the item "How much", which indicates that this open data can be secondarily used for free.

Sensor-side metadata corresponds to second data-side metadata, similarly to the open data-side metadata OMD, and includes 4W2H data. The sensor-side metadata may include a usage rule regarding secondary use. Also, similarly to the open data-side metadata OMD, application-side metadata includes 4W2H data. If a usage rule is defined for open data or sensing data (closed data) output from the sensor group 60, application-side metadata may include use condition data indicating what usage rule is used to enter a use contract. A configuration may be adopted in which, if sensor-side metadata is matched with application-side metadata by the matching unit 13, an application service provider is deemed to agree to use sensing data under the condition indicated in the item "How much" of the sensor-side metadata, and a data use contract is entered between the sensing data provider and the application service provider when this matching is established. Note that, although a case where the open data-side metadata OMD and the sensor-side metadata each include 4W2H data has been described in the present embodiment, the open data-side metadata OMD and the sensor-side metadata may include a portion of 4W2H data, may include data other than 4W2H data, or may include any item.

With the dataflow control command generation apparatus 10 according to the present embodiment, data that is suitable for use by an application can be extracted and data can be easily acquired by this application without performing many operations and taking up a large amount of communication traffic using a processor of the user terminal apparatus 40 that executes an application to retrieve data, and thus the operation load and the communication load on the user terminal apparatus 40 can be reduced. More specifically, according to the dataflow control command generation apparatus 10, data that is suitable for use by an application can be extracted and data can be easily acquired by this application without performing many operations and taking up a large amount of communication traffic using a processor of the user terminal apparatus 40 that executes an application to retrieve data, and thus the operation load and the communication load on the user terminal apparatus 40 can be reduced. According to the dataflow control command generation apparatus 10, open data can be distributed as appropriate, and open data can be smoothly used by an application.

With the dataflow control command generation apparatus 10 according to the present embodiment, the open data-side dataflow control command is transmitted to the open data management apparatus 20, and thus pieces of open data can be collectively managed by the open data management apparatus 20, and the operation load and the communication load for retrieving a target open data are reduced when the user terminal apparatus 40 uses open data.

Figure 5:
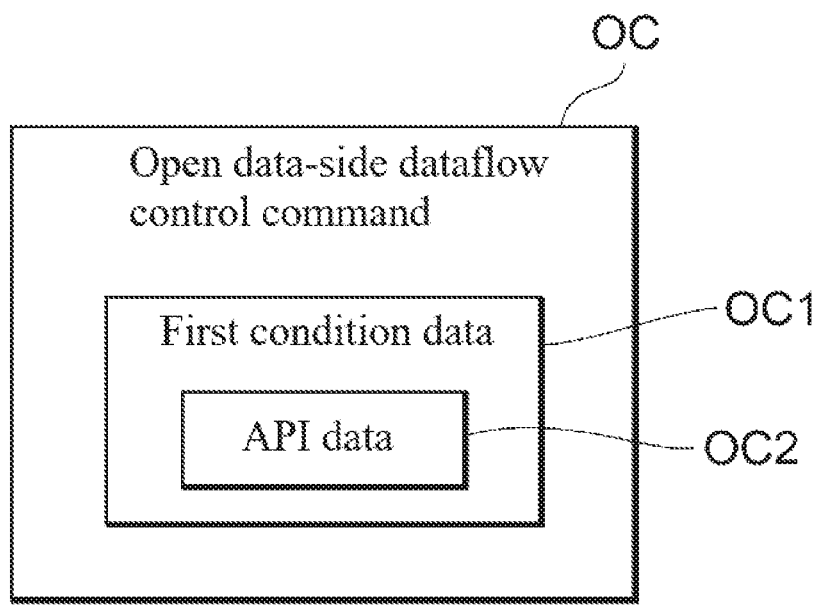
FIG. 5 is a diagram showing the content of an open data-side dataflow control command.

FIG. 5 is a diagram showing the content of an open data-side dataflow control command OC. The open data-side dataflow control command OC corresponds to a first data-side dataflow control command, and includes first condition data OC1 for acquiring open data extracted by the matching unit 13 from the database in which the open data is stored. The first condition data OC1 includes API data OC2 for acquiring open data from the database in which the open data is stored. The API data OC2 is an API (Application Programming Interface) for calling processing in which open data is acquired by the application executed by the user terminal apparatus 40 from the database in which the open data is stored.

As a result of the open data-side dataflow control command OC including the API data OC2 for acquiring open data from the database, the need to determine a data processing method each time open data is used is eliminated, processing executed by an application is simplified, and the operation load on the user terminal apparatus 40 is reduced.

Figure 6:
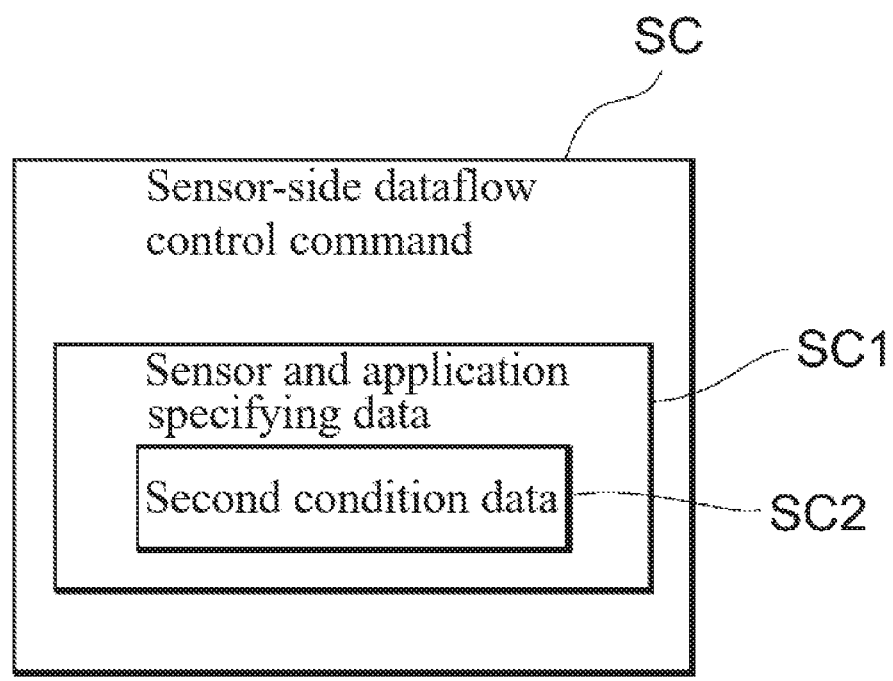
FIG. 6 is a diagram showing the content of a sensor-side dataflow control command.

FIG. 6 is a diagram showing the content of a sensor-side dataflow control command SC. The sensor-side dataflow control command SC corresponds to a second data-side dataflow control command, and includes sensor and application specifying data SC1 in which the sensor extracted by the matching unit 13 and an application are specified. The sensor and application specifying data SC1 includes second condition data SC2 for the sensor management apparatus 30 to transmit push-type sensing data to the application from the sensor extracted by the matching unit 13. When the sensor-side metadata is matched with the application-side metadata by the matching unit 13, the transmission unit 18 transmits, to the sensor management apparatus 30, the sensor-side dataflow control command SC including the second condition data SC2.

Because the sensor-side dataflow control command SC includes data SC2 (referred to as "second condition data SC2" hereinafter) for transmitting push-type sensing data from a sensor included in the sensor group 60 to an application, the application can acquire sensing data from the sensor group 60 in real time. Accordingly, an application can provide dynamic services according to the current state of a target to be measured by the sensor group 60. Also, as a result of transmitting push-type sensing data to the application, the need to retrieve sensing data that meets an application requirement using the processor of the user terminal apparatus is eliminated, and thus the operation load and the communication load on the user terminal apparatus 40 are reduced.

Note that the sensor-side dataflow control command SC does not necessarily include the second condition data SC2, and may include information for acquiring pull-type sensing data from a sensor included in the sensor group 60. In this case, information for acquiring pull-type sensing data from the sensor may include API data for calling processing for acquiring sensing data from the sensor group 60 (or the database).

Figure 7:
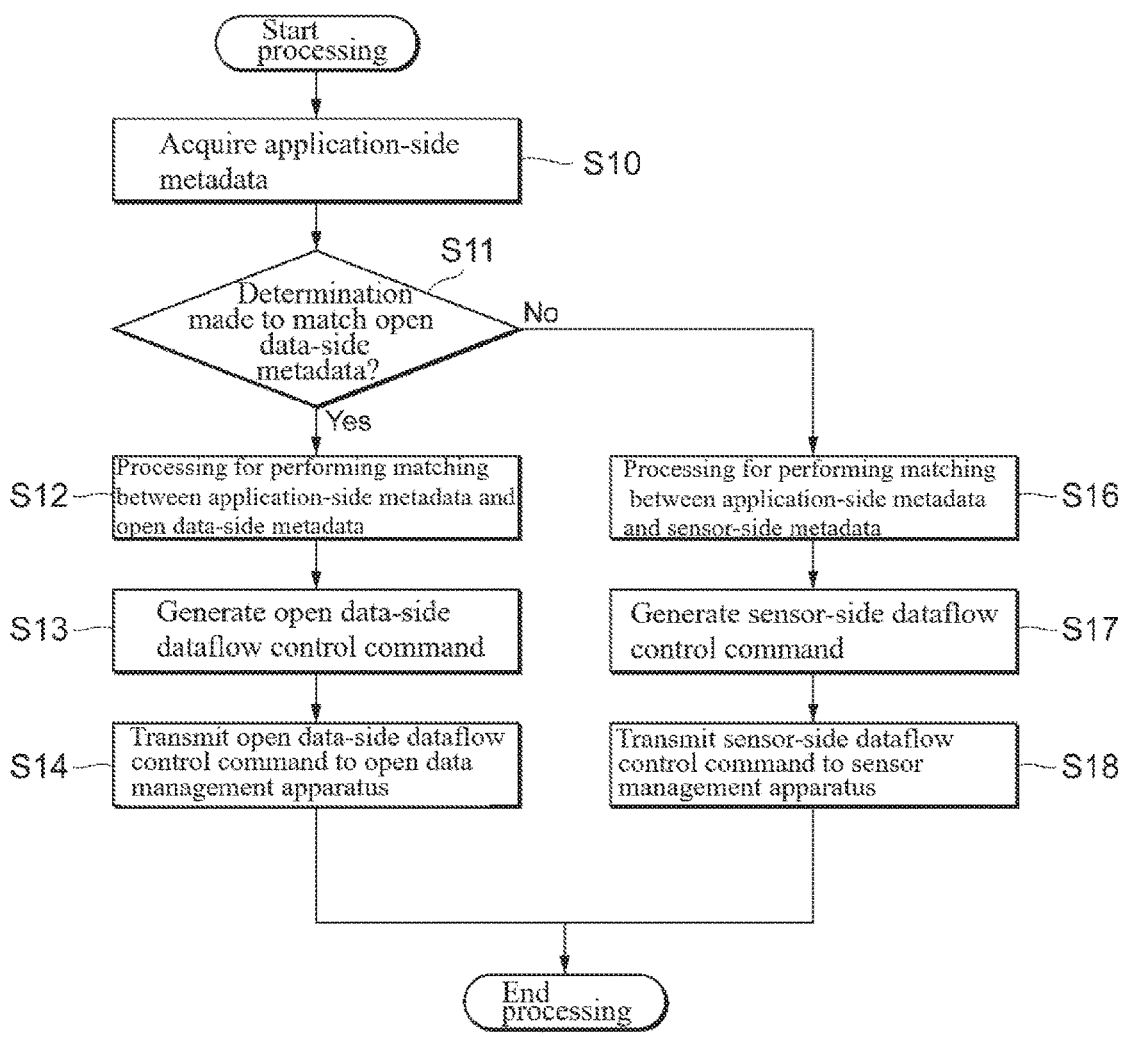
FIG. 7 is a flowchart showing first processing performed in the dataflow control command generation apparatus according to an embodiment of the present invention.

FIG. 7 is a flowchart showing first processing performed in the dataflow control command generation apparatus 10 according to an embodiment of the present invention. The first processing includes processing for determining, by the determination unit 15, which of the open data-side metadata or the sensor-side metadata is to be matched with the application-side metadata.

First, the dataflow control command generation apparatus 10 acquires application-side metadata from the user terminal apparatus 40 using the application-side metadata acquisition unit 14 (step S10). The determination unit 15 determines, based on the acquired application-side metadata, which of the open data-side metadata or the sensor-side metadata is to be matched with application-side metadata by the matching unit 13 (step S11).

If it is determined that the open data-side metadata is to be matched with the application-side metadata (step S11: Yes), the open data-side matching unit 13a performs processing for performing matching between the application-side metadata and the open data-side metadata (step S12). The open data-side dataflow control command generation unit 17a generates an open data-side dataflow control command including first condition data for acquiring open data from a database in which open data is stored, with regard to an application and open data that have been matched (step S13). The transmission unit 18 transmits the open data-side dataflow control command to the open data management apparatus 20 (step S14). Then, the open data management apparatus 20 transmits at least first condition data to the user terminal apparatus 40. That is, the dataflow control command generation apparatus 10 indirectly transmits the open data-side dataflow control command to the user terminal apparatus 40. However, the dataflow control command generation apparatus 10 may directly transmit the open data-side dataflow control command to the user terminal apparatus 40 without transmitting the open data-side dataflow control command to the open data management apparatus 20.

On the other hand, if it is determined that the sensor-side metadata is to be matched with the application-side metadata (step S11: No), the sensor-side matching unit 13b performs processing for performing matching between the application-side metadata and the sensor-side metadata (step S16), and extracts a sensor capable of providing sensing data that meets the application requirement from the sensor group 60. The sensor-side dataflow control command generation unit 17b generates a sensor-side dataflow control command in which the application and the sensor that have been matched are specified (step S17). The transmission unit 18 transmits the sensor-side dataflow control command to the sensor management apparatus 30 (step S18).

With the dataflow control command generation apparatus 10 according to the present embodiment, even if it is not clear in advance that data required by an application is included in open data or closed data, an appropriate matching target is determined by the determination unit 15, and thus an appropriate dataflow control command can be generated. Accordingly, the user terminal apparatus 40 does not need to determine whether the data required by the application is included in either open data or closed data, and the operation load and the communication load on the user terminal apparatus 40 are reduced.

Figure 8:
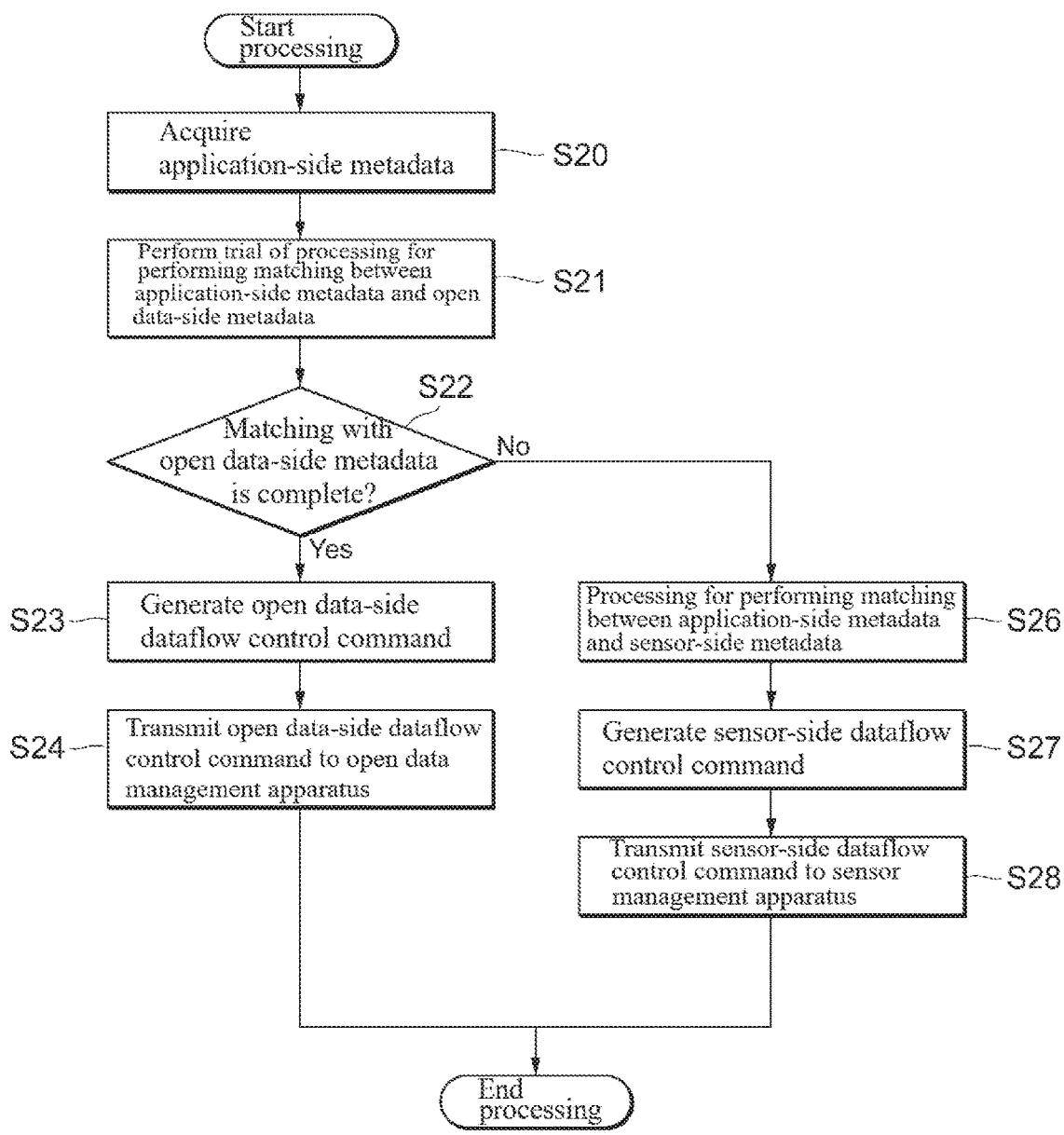
FIG. 8 is a flowchart showing second processing performed in the dataflow control command generation apparatus according to an embodiment of the present invention.

FIG. 8 is a flowchart showing second processing performed in the dataflow control command generation apparatus 10 according to an embodiment of the present invention. The second processing includes processing in which open data-side metadata is preferentially matched by the matching unit 13 with application-side metadata rather than sensor-side metadata.

First, the dataflow control command generation apparatus 10 acquires application-side metadata from the user terminal apparatus 40 using the application-side metadata acquisition unit 14 (step S20). The matching unit 13 performs a trial of matching processing to preferentially match open data-side metadata with the acquired application-side metadata rather than sensor-side metadata (step S21).

When matching between the application-side metadata and the open data-side metadata is complete (step S22: Yes), the open data-side dataflow control command generation unit 17a generates an open data-side dataflow control command including the first condition data for acquiring open data from the database in which open data is stored, with regard to the application and the open data that have been matched (step S23). The transmission unit 18 transmits the open data-side dataflow control command to the open data management apparatus 20 (step S24). Then, the open data management apparatus 20 transmits at least the first condition data to the user terminal apparatus 40. The dataflow control command generation apparatus 10 may directly transmit the open data-side dataflow control command to the user terminal apparatus 40 without transmitting the open data-side dataflow control command to the open data management apparatus 20.

On the other hand, if matching between the application-side metadata and the open data-side metadata is not complete, that is, when open data-side metadata that can be matched with the application-side metadata is not found (step S22: No), then the sensor-side matching unit 13b performs processing for performing matching between the application-side metadata and the sensor-side metadata (step S26), and extracts a sensor capable of providing sensing data that meets an application requirement from the sensor group 60. The sensor-side dataflow control command generation unit 17b generates a sensor-side dataflow control command in which the application and the sensor that have been matched are specified (step S27). The transmission unit 18 transmits the sensor-side dataflow control command to the sensor management apparatus 30 (step S28).

With the dataflow control command generation apparatus 10 according to the present embodiment, even if it is not clear in advance that data required by the application is included in open data or in closed data, an appropriate dataflow control command can be generated through consistent processing. Accordingly, operations and communication of dataflow control command generation processing performed by the dataflow control command generation apparatus 10 are simplified, and the operation load and the communication load on the dataflow control command generation apparatus 10 are reduced. Also, the user terminal apparatus 40 does not need to determine whether data required by the application is included in either open data or closed data, and the operation load and the communication load on the user terminal apparatus 40 are reduced. Also, if both closed data and open data include data that meets an application requirement, it is possible to preferentially use open data that can be secondarily used for free, to suppress an increase in a fee for data use, and to further reduce a cost required to provide a service.

With the dataflow control command generation apparatus 10 according to the present embodiment, both static data stored in a database and dynamic data output in real time can be distributed as appropriate, and be smoothly used by an application. Also, static data and dynamic data are classified according to metadata, and thus processing in which static data and dynamic data are classified by the user terminal apparatus 40 is not required, and the operation load on the user terminal apparatus 40 is reduced. Also, both free data and paid data can be distributed as appropriate, and can be smoothly used by an application. Also, free data and paid data are classified according to metadata, and thus processing in which free data and paid data are classified by the user terminal apparatus 40 is not required, and the operation load on the user terminal apparatus 40 is reduced.

Figure 9:
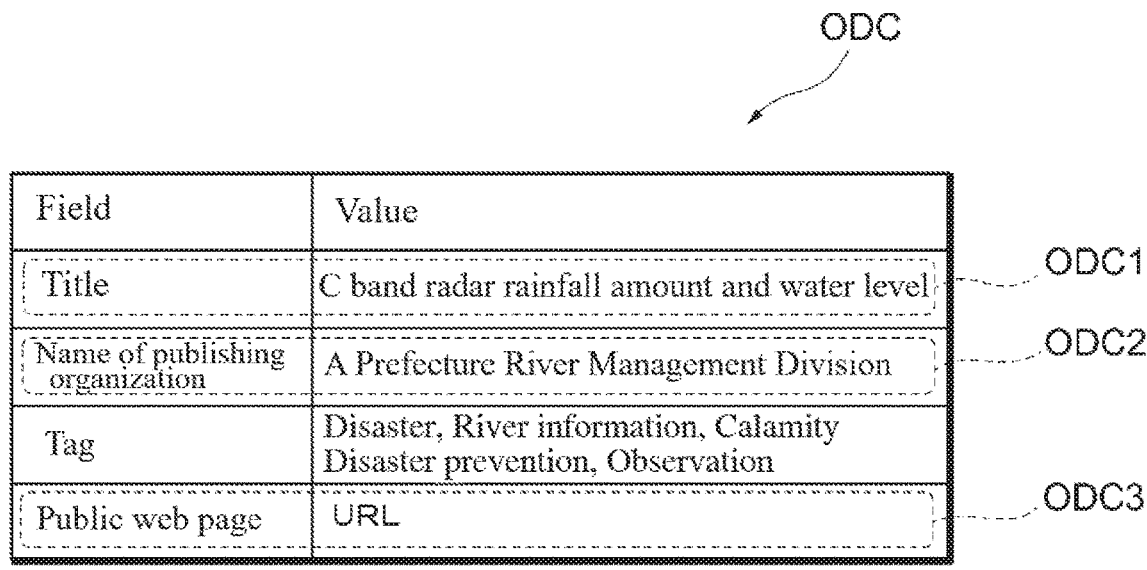
FIG. 9 is a diagram showing an example of an open data catalog acquired by the dataflow control command generation apparatus according to an embodiment of the present invention.

FIG. 9 is a diagram showing an example of an open data catalog ODC acquired by the dataflow control command generation apparatus 10 according to an embodiment of the present invention. Hereinafter, how open data-side metadata OMD shown in FIG. 4 is generated by the metadata generation unit 16 according to the present embodiment will be described in detail with reference to FIGS. 9 to 11. The metadata generation unit 16 acquires the open data catalog ODC from the first database 51, the second database 52, or another database. The open data catalog ODC may be acquired from an open data catalog site. The open data catalog ODC is associated with open data, includes bibliographic information regarding open data, and indicates the overview of open data.

The open data catalog ODC includes an item "Field", an item "Title" ODC1, an item "Name of publishing organization" ODC2, an item "Tag", and an item "Public web page" ODC3. The item "Field" indicates data attributes of open data, and is a "value", that is, a numerical value in this example. The item "Title" ODC1 indicates the title attached to open data, and indicates "C band radar rainfall amount and water level" in this example. The item "Name of publishing organization" ODC2 indicates the name of an organization that has published open data, and is "A Prefecture River Management Division" in this example. The item "Tag" indicates a tag attached to retrieve open data, and is "disaster, river information, calamity, disaster prevention, observation" in this example. The item "Public web page" ODC3 indicates the location of the web page on which open data is published, is a "URL (Uniform Resource Locator)" in this example, and is a URL for specifying the location on the Internet. Note that the five items described here are examples, and the open data catalog ODC does not necessarily include all of these items, and may also include items other than these five items.

The metadata generation unit 16 extracts the genre of open data with reference to the item "Title" ODC1. The genre of open data indicates information with which the field associated with this open data can be specified, and may be the manufacturing field or the industrial field associated with open data, such as mobility, medical and health, public infrastructure and construction, energy, agriculture, physical distribution and circulation, public administration, industrial security, educational services, finance, smart houses, and tourism, for example. The metadata generation unit 16 may determine which genre open data belongs to, based on the content of the item "Title" ODC1. For example, with regard to the item "Title" ODC1, the metadata generation unit 16 may calculate the degree of dependency regarding a plurality of genres, extract a genre with the highest degree of dependency, or extract a plurality of genres in descending order of the degree of dependency. Also, the metadata generation unit 16 may extract the genre of open data with reference to items other than the item "Title" ODC1 included in the open data catalog ODC. For example, the metadata generation unit 16 may retrieve items that are appropriate to extract a genre from the items included in the open data catalog ODC, and extract the genre of open data from the retrieved items.

The metadata generation unit 16 extracts the item "Who" in 4W2H data of the open data-side metadata OMD with reference to the item "Name of publishing organization" ODC2. In this example, the extracted item is "A Prefecture River Management Division", and as shown in FIG. 4, this item is the item "Who" of the open data-side metadata OMD. The metadata generation unit 16 may also extract the item "Who" of the open data-side metadata OMD with reference to items other than the item "Name of publishing organization" ODC2 included in the open data catalog ODC. For example, the metadata generation unit 16 may retrieve items that are appropriate to extract the item "Who" from the items included in the open data catalog ODC, and extract the item "Who" from the retrieved items.

The metadata generation unit 16 extracts the item "How" in 4W2H data of the open data-side metadata OMD with reference to the item "Public web page" ODC3. In this example, the extracted item is "URL", and as shown in FIG. 4, this item is the item "How" of the open data-side metadata OMD. The metadata generation unit 16 may extract the item "How" of the open data-side metadata OMD with reference to items other than item "Public web page" ODC3 included in the open data catalog ODC. For example, the metadata generation unit 16 may retrieve items that are appropriate to extract the item "How" from the items included in the open data catalog ODC, and extract the item "How" from the retrieved items.

FIG. 10 is a diagram showing an example of a web page DP on which open data is published. The example of the web page DP that is shown in FIG. 10 and on which open data is published is obtained by accessing a URL written in the item "Public web page" ODC3 of the open data catalog ODC shown in FIG. 9. The Public web page DP is a web page entitled "River disaster prevention information", and a web page on which "past data (water level of river)" is published. The Public web page DP includes a first item DP1, a second item DP2, and a third item.

The metadata generation unit 16 retrieves open data based on a vocabulary corresponding to the genre to which open data belongs, and extracts open data-side metadata from the open data. The metadata generation unit 16 determines the vocabulary used to retrieve the Public web page DP based on the genre of the open data extracted from the open data catalog ODC. "Vocabularies" may be different from each other depending on the genre of the open data, and may be a set of words that are frequently used in each genre. The metadata generation unit 16 extracts 4W2H data of the open data-side metadata OMD from the Public web page DP due to perfect matching or partial matching with words included in a vocabulary. This makes it possible to retrieve open data using the vocabulary that is appropriate to the content of the open data, and to efficiently extract the open data-side metadata. Thus, it is possible to further reduce the operation load on the dataflow control command generation apparatus 10 and generate the open data-side metadata.

The first item DP1 includes "X River" as "River name", and "B City in A Prefecture" as "Location". The item "Where" is extracted from the 4W2H data of the open data-side metadata OMD with reference to the first item DP1 of the Public web page DP. In this example, the extracted item is "X River in B City in A Prefecture", and as shown in FIG. 4, this item is the item "Where" of the open data-side metadata OMD. Note that the metadata generation unit 16 may extract "Water system name" written in the Public web page DP, and regard information about "X River in Y River water system" as the open data-side metadata OMD.

The second item DP2 includes "YY/MM/DD" to "yy/mm/dd" as "Date". The metadata generation unit 16 extracts the item "When" from the 4W2H data of the open data-side metadata OMD with reference to the second item DP2 of the Public web page DP. In this example, the extracted item is "YY/MM/DD to yy/mm/dd", and as shown in FIG. 3, this item is the item "When" of the open data-side metadata OMD.

The third item DP3 includes "Water level (m)" as "Observation item". The metadata generation unit 16 extracts the item "What" from the 4W2H data of the open data-side metadata OMD with reference to the third item DP3 of the Public web page DP. In this example, the extracted item is "water level", and is the item "What" of the open data-side metadata OMD shown in FIG. 4, together with the information regarding "X River" included in the item "Where".

The Public web page DP publishes data regarding the water level of the X River every hour for each date. For example, with regard to the date "YY/MM/DD", the water level of the X River is "0.98" (m) at 1 a.m. and 2 a.m., and "0.95" (m) at midnight. Also, with regard to the date "yy/mm/dd", the water level of the X River is "0.95" (m) at 1 a.m. and 2 a.m., and "0.96" (m) at midnight. Data regarding the water level of the X River is open data, and the dataflow control command generation apparatus 10 according to the present embodiment provides this open data with the open data-side metadata ODM shown in FIG. 4 using the metadata generation unit 16, and facilitates smooth distribution of open data and use of open data by an application.

Figure 11:
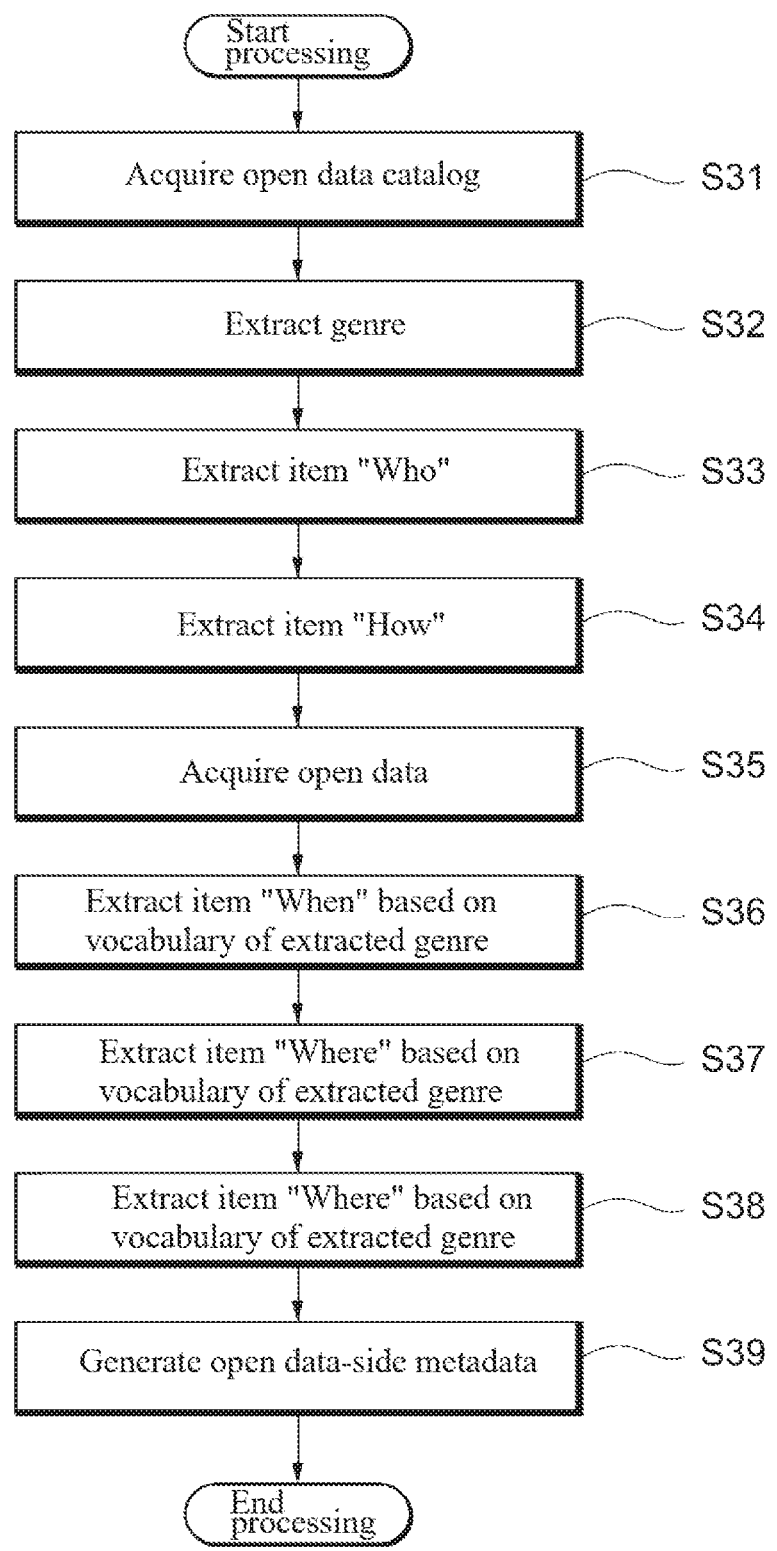
FIG. 11 is a flowchart showing open data-side metadata generation processing performed by the dataflow control command generation apparatus according to an embodiment of the present invention.

FIG. 11 is a flowchart showing open data-side metadata generation processing performed by the dataflow control command generation apparatus 10 according to an embodiment of the present invention. The metadata generation unit 16 of the dataflow control command generation apparatus 10 first acquires the open data catalog of open data to be provided with metadata (step S31). The metadata generation unit 16 extracts the genre of the open data with reference to the item "Title" included in the open data catalog (step S32). Also, the metadata generation unit 16 extracts the item "Who" from the 4W2H data of the open data-side metadata with reference to the item "Name of publishing organization" (step S33). Also, the metadata generation unit 16 extracts the item "How" from the 4W2H data of the open data-side metadata with reference to the item "Public web page" (step S34).

As a result of accessing the "Public web page" written in the open data catalog, the metadata generation unit 16 acquires the open data (browses public web pages) (step S35). Also, the metadata generation unit 16 determines the vocabulary list used to search public web pages based on the genre of the open data extracted from the open data catalog ODC. The metadata generation unit 16 extracts the item "When" from the 4W2H data of the open data-side metadata on the Public web page based on the vocabulary corresponding to the extracted genre (step S36). Also, the metadata generation unit 16 extracts the item "Where" from the 4W2H data of the open data-side metadata on the Public web page based on the vocabulary corresponding to the extracted genre (step S37). Also, the metadata generation unit 16 extracts the item "What" from the 4W2H data of the open data-side metadata on the Public web page based on the vocabulary corresponding to the extracted genre (step S38). Lastly, the metadata generation unit 16 generates open data-side metadata based on the extracted 4W2H data (step S39). Thus, the open data-side metadata generation processing ends.

Because the dataflow control command generation apparatus 10 according to the present embodiment includes the metadata generation unit 16, even if open data is not provided with metadata, metadata can be newly generated to provide an opportunity for open data to be used by an application. Metadata is automatically generated based on the specific content of open data, and accordingly, a larger amount of open data can be classified, and usage and utilization of a larger amount of open data are achieved. Also, as a result of a decrease in the amount of open data with which metadata is not provided, a larger amount of open data can be used by applications executed on the user terminal apparatus 40 while the operation load and the communication load for retrieving open data using the user terminal apparatus 40 are reduced.

The above-described embodiment is for facilitating understanding of the present invention and is not intended to limit the interpretation of the present invention. Elements included in the embodiment and their arrangement, materials, conditions, shapes, size, and the like are not limited to the examples and can be changed as appropriate. Also, it is possible to partially replace or combine configurations described in different embodiments.

Also, part or all of the above-described embodiments will be described as the following additional remarks, but are not limited thereto.

Additional Remark 1

A dataflow control command generation apparatus including:

at least one memory; and at least one hardware processor connected to the memory, in which the hardware processor is configured to acquire first data-side metadata that is information regarding first data, acquire application-side metadata that is information regarding an application that provides a service using the first data, extract first data that meets a requirement of the application through matching between the first data-side metadata and the application-side metadata, and transmit, to a user terminal apparatus that executes the application, a dataflow control command including information for acquiring the first data from a database in which the first data extracted by the matching unit is stored.

Additional Remark 2

A dataflow control command generation method including:

a first step of acquiring first data-side metadata that is information regarding first data, by at least one hardware processor;

a second step of acquiring application-side metadata that is information regarding an application that provides a service using the first data, by the hardware processor;

a third step of extracting first data that meets a requirement of the application through matching between the first data-side metadata and the application-side metadata, by the hardware processor; and a fourth step of transmitting, to a user terminal apparatus that executes the application, a dataflow control command including information for acquiring the first data from a database in which the first data extracted in the third step is stored.

LIST OF REFERENCE NUMERALS

10 Dataflow control command generation apparatus
10a CPU
10b RAM
10c ROM
10d Communication unit
10e Input unit
10f Display unit
11 Sensor-side metadata acquisition unit
12 Open data-side metadata acquisition unit
13 Matching unit
13a Open data-side matching unit
13b Sensor-side matching unit
14 Application-side metadata acquisition unit
15 Determination unit
16 Metadata generation unit
17 Dataflow control command generation unit
17a Open data-side dataflow control command generation unit
17b Sensor-side dataflow control command generation unit
18 Transmission unit
20 Open data management apparatus
30 Sensor management apparatus
40 User terminal apparatus
50 Database group
51 First database
52 Second database
60 Sensor group
61 First sensor
62 Second sensor
DP Public web page
DP1 First item
DP2 Second item
DP3 Third item
OC Open data-side dataflow control command
OC1 First condition data
OC2 API data
ODC Open data catalog
ODC1 Item "Title"
ODC2 Item "Name of publishing organization"
ODC3 Item "Public web page"
OMD Open data-side metadata
SC Sensor-side dataflow control command
SC1 Sensor and application specifying data
SC2 Second condition data

The invention claimed is:

1. A dataflow control command generation apparatus comprising a processor configured with a program to perform operations comprising:

acquiring first data-side metadata that is information regarding first data;

acquiring application-side metadata that is information regarding an application that provides a service using the first data;

extracting first data that meets a requirement of the application through matching between the first data-side metadata and the application-side metadata; and transmitting, to a user terminal apparatus that executes the application, a dataflow control command including information for acquiring the first data from a database in which the extracted first data is stored, wherein the processor is configured with the program to perform operations further comprising acquiring second data-side metadata that is information regarding second data, wherein the processor is configured with the program such that extracting first data that meets the requirement of the application through matching between the first data-side metadata and the application-side metadata comprises extracting second data that meets a requirement of the application through matching between the second data-side metadata and the application-side metadata, and transmitting, to the user terminal apparatus that executes the application, the dataflow control command including information for acquiring the first data from the database in which the extracted first data is stored comprises transmitting, to a second data management apparatus that manages the extracted second data, a dataflow control command in which the extracted second data and the application are specified, and wherein the processor is configured with the program to perform operations further comprising determining which of the first data-side metadata or the second data-side metadata is to be matched with the application-side metadata.

2. The dataflow control command generation apparatus according to claim 1, wherein the processor is configured with the program such that transmitting, to the user terminal apparatus that executes the application, the dataflow control command including information for acquiring the first data from a database in which extracted first data is stored comprises transmitting the dataflow control command to a first data management apparatus that manages the extracted first data, wherein the processor is configured with the program to perform operations further comprising acquiring second data-side metadata that is information regarding second data, wherein the processor is configured with the program such that extracting first data that meets the requirement of the application through matching between the first data-side metadata and the application-side metadata comprises extracting second data that meets a requirement of the application through matching between the second data-side metadata and the application-side metadata, and transmitting, to the user terminal apparatus that executes the application, the dataflow control command including information for acquiring the first data from the database in which the extracted first data is stored comprises transmitting, to a second data management apparatus that manages the second data extracted by the matching unit, a dataflow control command in which the extracted second data and the application are specified, and wherein the processor is configured with the program to perform operations further comprising determining which of the first data-side metadata or the second data-side metadata is to be matched with the application-side metadata.

3. The dataflow control command generation apparatus according to claim 1, wherein the processor is configured with the program such that the first data includes data stored in the database, and the second data includes data output from a sensor.

4. The dataflow control command generation apparatus according to claim 1, wherein the processor is configured with the program such that the first data includes data that can be secondarily used for free, and the second data includes data that cannot be secondarily used or data that can be secondarily used with a fee.

5. A dataflow control command generation apparatus comprising a processor configured with a program to perform operations comprising:

acquiring first data-side metadata that is information regarding first data;

acquiring application-side metadata that is information regarding an application that provides a service using the first data;

extracting first data that meets a requirement of the application through matching between the first data-side metadata and the application-side metadata; and transmitting, to a user terminal apparatus that executes the application, a dataflow control command including information for acquiring the first data from a database in which the extracted first data is stored, wherein the processor is configured with the program to perform operations further comprising acquiring second data-side metadata regarding second data, and wherein the processor is configured with the program such that extracting first data that meets the requirement of the application through matching between the first data-side metadata and the application-side metadata comprises extracting second data that meets a requirement of the application through matching between the second data-side metadata and the application-side metadata, transmitting, to the user terminal the extracted first data is stored comprises transmitting, to the second data management apparatus, a dataflow control command for transmitting push-type second data to the application, if the second data-side metadata is matched with the application-side metadata.

6. A dataflow control command generation apparatus comprising a processor configured with a program to perform operations comprising:

acquiring first data-side metadata that is information regarding first data;

acquiring application-side metadata that is information regarding an application that provides a service using the first data;

extracting first data that meets a requirement of the application through matching between the first data-side metadata and the application-side metadata; and transmitting, to a user terminal apparatus that executes the application, a dataflow control command including information for acquiring the first data from a database in which the extracted first data is stored, wherein the processor is configured with the program such that transmitting, to the user terminal apparatus that executes the application, the dataflow control command including information for acquiring the first data from the database in which the apparatus that executes the application, the dataflow control command including information for acquiring the first data from a database in which the extracted first data is stored comprises transmitting, to a second data management apparatus that manages the extracted second data, a dataflow control command in which the extracted second data and the application are specified, and extracting first data that meets the requirement of the application through matching between the first data-side metadata and the application-side metadata further comprises preferentially matching the first data-side metadata with the application-side metadata rather than the second data-side metadata.

7. A dataflow control command generation apparatus comprising a processor configured with a program to perform operations comprising:

acquiring first data-side metadata that is information regarding first data;

acquiring application-side metadata that is information regarding an application that provides a service using the first data;

extracting first data that meets a requirement of the application through matching between the first data-side metadata and the application-side metadata; and transmitting, to a user terminal apparatus that executes the application, a dataflow control command including information for acquiring the first data from a database in which the extracted first data is stored, wherein the processor is configured with the program to perform operations further comprising generating the first data-side metadata based on the content of the first data, wherein the processor is configured with the program to perform operations further comprising acquiring second data-side metadata that is information regarding second data, wherein the processor is configured with the program such that extracting first data that meets the requirement of the application through matching between the first data-side metadata and the application-side metadata comprises extracting second data that meets a requirement of the application through matching between the second data-side metadata and the application-side metadata, and transmitting, to the user terminal apparatus that executes the application, the dataflow control command including information for acquiring the first data from the database in which the extracted first data is stored comprises transmitting, to a second data management apparatus that manages the extracted second data, a dataflow control command in which the extracted second data and the application are specified, and wherein the processor is configured with the program to perform operations further comprising determining which of the first data-side metadata or the second data-side metadata is to be matched with the application-side metadata.

8. A dataflow control command generation apparatus comprising a processor configured with a program to perform operations comprising:

acquiring first data-side metadata that is information regarding first data;

acquiring application-side metadata that is information regarding an application that provides a service using the first data;

extracting first data that meets a requirement of the application through matching between the first data-side metadata and the application-side metadata; and transmitting, to a user terminal apparatus that executes the application, a dataflow control command including information for acquiring the first data from a database in which the extracted first data is stored, wherein the processor is configured with the program to perform operations further comprising generating the first data-side metadata based on the content of the first data, wherein the processor is configured with the program such that generating the first data-side metadata based on the content of the first data comprises retrieving the first data based on a vocabulary corresponding to a genre to which the first data belongs, and extracting the first data-side metadata from the first data, wherein the processor is configured with the program to perform operations further comprising acquiring second data-side metadata that is information regarding second data, wherein the processor is configured with the program such that extracting first data that meets the requirement of the application through matching between the first data-side metadata and the application-side metadata comprises extracting second data that meets a requirement of the application through matching between the second data-side metadata and the application-side metadata, and transmitting, to the user terminal apparatus that executes the application, the dataflow control command including information for acquiring the first data from the database in which the extracted first data is stored comprises transmitting, to a second data management apparatus that manages the extracted second data, a dataflow control command in which the extracted second data and the application are specified, and wherein the processor is configured with the program to perform operations further comprising determining which of the first data-side metadata or the second data-side metadata is to be matched with the application-side metadata.

9. A dataflow control command generation apparatus comprising a processor configured with a program to perform operations comprising:

acquiring first data-side metadata that is information regarding first data;

acquiring application-side metadata that is information regarding an application that provides a service using the first data;

extracting first data that meets a requirement of the application through matching between the first data-side metadata and the application-side metadata; and transmitting, to a user terminal apparatus that executes the application, a dataflow control command including information for acquiring the first data from a database in which the extracted first data is stored, wherein the processor is configured with the program such that the dataflow control command includes API data for calling processing in which the first data is acquired by the application from the database in which the first data is stored, wherein the processor is configured with the program to perform operations further comprising acquiring second data-side metadata that is information regarding second data, wherein the processor is configured with the program such that extracting first data that meets the requirement of the application through matching between the first data-side metadata and the application-side metadata comprises extracting second data that meets a requirement of the application through matching between the second data-side metadata and the application-side metadata, and transmitting, to the user terminal apparatus that executes the application, the dataflow control command including information for acquiring the first data from the database in which the extracted first data is stored comprises transmitting, to a second data management apparatus that manages the second data extracted by the matching unit, a dataflow control command in which the extracted second data and the application are specified, and wherein the processor is configured with the program to perform operations further comprising determining which of the first data-side metadata or the second data-side metadata is to be matched with the application-side metadata.

10. A dataflow control command generation apparatus comprising a processor configured with a program to perform operations comprising:

acquiring first data-side metadata that is information regarding first data;

acquiring application-side metadata that is information regarding an application that provides a service using the first data;

extracting first data that meets a requirement of the application through matching between the first data-side metadata and the application-side metadata; and transmitting, to a user terminal apparatus that executes the application, a dataflow control command including information for acquiring the first data from a database in which the extracted first data is stored, wherein the processor is configured with the program such that transmitting, to a user terminal apparatus that executes the application, a dataflow control command including information for acquiring the first data from a database in which the first data extracted is stored comprises transmitting the dataflow control command to a first data management apparatus that manages the extracted first data, wherein the processor is configured with the program to perform operations further comprising acquiring second data-side metadata regarding second data, wherein the processor is configured with the program such that extracting first data that meets a requirement of the application through matching between the first data-side metadata and the application-side metadata comprises extracting second data that meets a requirement of the application through matching between the second data-side metadata and the application-side metadata, and transmitting, to a user terminal apparatus that executes the application, a dataflow control command including information for acquiring the first data from a database in which the first data extracted is stored comprises transmitting, to a second data management apparatus that manages the extracted second data, a dataflow control command in which the extracted second data extracted and the application are specified, and wherein the processor is configured with the program such that extracting first data that meets a requirement of the application through matching between the first data-side metadata and the application-side metadata further comprises preferentially matching the first data-side metadata with the application-side metadata rather than the second data-side metadata.

11. A dataflow control command generation apparatus comprising a processor configured with a program to perform operations comprising:

acquiring first data-side metadata that is information regarding first data;

acquiring application-side metadata that is information regarding an application that provides a service using the first data;

extracting first data that meets a requirement of the application through matching between the first data-side metadata and the application-side metadata; and transmitting, to a user terminal apparatus that executes the application, a dataflow control command including information for acquiring the first data from a database in which the extracted first data is stored, wherein the processor is configured with the program to perform operations further comprising generating the first data-side metadata based on the content of the first data, wherein the processor is configured with the program to perform operations further comprising acquiring second data-side metadata regarding second data, wherein the processor is configured with the program such that extracting first data that meets the requirement of the application through matching between the first data-side metadata and the application-side metadata comprises extracting second data that meets a requirement of the application through matching between the second data-side metadata and the application-side metadata, and transmitting, to the user terminal apparatus that executes the application, the dataflow control command including information for acquiring the first data from the database in which the first data extracted is stored comprises transmitting, to a second data management apparatus that manages the extracted second data, a dataflow control command in which the extracted second data and the application are specified, and wherein the processor is configured with the program such that further comprises preferentially matching the first data-side metadata with the application-side metadata rather than the second data-side metadata.

12. A dataflow control command generation apparatus comprising a processor configured with a program to perform operations comprising:

acquiring first data-side metadata that is information regarding first data;

acquiring application-side metadata that is information regarding an application that provides a service using the first data;

extracting first data that meets a requirement of the application through matching between the first data-side metadata and the application-side metadata; and transmitting, to a user terminal apparatus that executes the application, a dataflow control command including information for acquiring the first data from a database in which the extracted first data is stored, wherein the processor is configured with the program to perform operations further comprising generating the first data-side metadata based on the content of the first data, wherein the processor is configured with the program such that generating the first data-side metadata based on the content of the first data comprises retrieving the first data based on a vocabulary corresponding to a genre to which the first data belongs, and extracting the first data-side metadata from the first data, wherein the processor is configured with the program to perform operations further comprising acquiring second data-side metadata regarding second data, wherein the processor is configured with the program such that extracting first data that meets a requirement of the application through matching between the first data-side metadata and the application-side metadata comprises extracting second data that meets a requirement of the application through matching between the second data-side metadata and the application-side metadata, and transmitting, to the user terminal apparatus that executes the application, the dataflow control command including information for acquiring the first data from the database in which the first data extracted is stored comprises transmitting, to a second data management apparatus that manages the extracted second data, a dataflow control command in which the extracted second data and the application are specified, and wherein the processor is configured with the program such that extracting first data that meets a requirement of the application through matching between the first data-side metadata and the application-side metadata further comprises preferentially matching the first data-side metadata with the application-side metadata rather than the second data-side metadata.

13. A dataflow control command generation apparatus comprising a processor configured with a program to perform operations comprising:

acquiring first data-side metadata that is information regarding first data;

acquiring application-side metadata that is information regarding an application that provides a service using the first data;

extracting first data that meets a requirement of the application through matching between the first data-side metadata and the application-side metadata; and transmitting, to a user terminal apparatus that executes the application, a dataflow control command including information for acquiring the first data from a database in which the extracted first data is stored, wherein the processor is configured with the program such that the dataflow control command includes API data for calling processing in which the first data is acquired by the application from the database in which the first data is stored, wherein the processor is configured with the program to perform operations further comprising acquiring second data-side metadata regarding second data, wherein the processor is configured with the program such that extracting first data that meets a requirement of the application through matching between the first data-side metadata and the application-side metadata comprises extracting second data that meets a requirement of the application through matching between the second data-side metadata and the application-side metadata, and transmitting, to the user terminal apparatus that executes the application, the dataflow control command including information for acquiring the first data from the database in which the first data extracted is stored comprises transmitting, to a second data management apparatus that manages the extracted second data, a dataflow control command in which the extracted second data and the application are specified, and wherein the processor is configured with the program such that extracting first data that meets a requirement of the application through matching between the first data-side metadata and the application-side metadata further comprises preferentially matching the first data-side metadata with the application-side metadata rather than the second data-side metadata.

14. A dataflow control command generation method executed by a processor, the dataflow control command generation method comprising:

acquiring first data-side metadata that is information regarding first data;

acquiring application-side metadata that is information regarding an application that provides a service using the first data;

extracting first data that meets a requirement of the application through matching between the first data-side metadata and the application-side metadata; and transmitting, to a user terminal apparatus that executes the application, a dataflow control command including information for acquiring the first data from a database in which the first data is stored, wherein the dataflow control command generation method further comprises acquiring second data-side metadata that is information regarding second data, extracting second data that meets a requirement of the application through matching between the second data-side metadata and the application-side metadata, and transmitting, to a second data management apparatus that manages the extracted second data, a dataflow control command in which the extracted second data and the application are specified, and wherein the dataflow control command generation method further comprises determining which of the first data-side metadata or the second data-side metadata is to be matched with the application-side metadata.

15. A dataflow control command generation method executed by a processor, the dataflow control command generation method comprising:

acquiring first data-side metadata that is information regarding first data;

acquiring application-side metadata that is information regarding an application that provides a service using the first data;

extracting first data that meets a requirement of the application through matching between the first data-side metadata and the application-side metadata; and transmitting, to a user terminal apparatus that executes the application, a dataflow control command including information for acquiring the first data from a database in which the first data is stored, wherein the dataflow control command generation method further comprises acquiring second data-side metadata regarding second data, extracting second data that meets a requirement of the application through matching between the second data-side metadata and the application-side metadata, and transmitting, to a second data management apparatus that manages the extracted second data, a dataflow control command in which the extracted second data and the application are specified, wherein the dataflow control command generation method further comprises preferentially matching the first data-side metadata with the application-side metadata rather than the second data-side metadata.

16. A non-transitory computer-readable storage medium storing a dataflow control command generation program for causing a processor to perform operations comprising:

acquiring first data-side metadata that is information regarding first data;

acquiring application-side metadata that is information regarding an application that provides a service using the first data;

extracting first data that meets a requirement of the application through matching between the first data-side metadata and the application-side metadata; and transmitting, to a user terminal apparatus that executes the application, a dataflow control command including information for acquiring the first data from a database in which the extracted first data is stored, wherein the processor is configured with the dataflow control command generation program to perform operations further comprising acquiring second data-side metadata that is information regarding second data, wherein the processor is configured with the dataflow control command generation program such that extracting first data that meets the requirement of the application through matching between the first data-side metadata and the application-side metadata comprises extracting second data that meets a requirement of the application through matching between the second data-side metadata and the application-side metadata, and transmitting, to the user terminal apparatus that executes the application, the dataflow control command including information for acquiring the first data from the database in which the extracted first data is stored comprises transmitting, to a second data management apparatus that manages the extracted second data, a dataflow control command in which the extracted second data and the application are specified, and wherein the processor is configured with the dataflow control command generation program to perform operations further comprising determining which of the first data-side metadata or the second data-side metadata is to be matched with the application-side metadata.

17. A non-transitory computer-readable storage medium storing a dataflow control command generation program for causing a processor to perform operations comprising:

acquiring first data-side metadata that is information regarding first data;

acquiring application-side metadata that is information regarding an application that provides a service using the first data;

extracting first data that meets a requirement of the application through matching between the first data-side metadata and the application-side metadata; and transmitting, to a user terminal apparatus that executes the application, a dataflow control command including information for acquiring the first data from a database in which the extracted first data is stored, wherein the processor is configured with the dataflow control command generation program to perform operations further comprising acquiring second data-side metadata regarding second data, and wherein the processor is configured with the dataflow control command generation program such that extracting first data that meets the requirement of the application through matching between the first data-side metadata and the application-side metadata comprises extracting second data that meets a requirement of the application through matching between the second data-side metadata and the application-side metadata, transmitting, to the user terminal apparatus that executes the application, the dataflow control command including information for acquiring the first data from the database in which the first data extracted is stored comprises transmitting, to a second data management apparatus that manages the extracted second data, a dataflow control command in which the extracted second data and the application are specified, and extracting first data that meets the requirement of the application through matching between the first data-side metadata and the application-side metadata further comprises preferentially matching the first data-side metadata with the application-side metadata rather than the second data-side metadata.

* * * * *